United States Patent
Kawamura

(10) Patent No.: US 8,767,092 B2
(45) Date of Patent: Jul. 1, 2014

(54) IMAGE RESTORATION DEVICE, IMAGING APPARATUS, AND IMAGE RESTORATION METHOD

(75) Inventor: Takashi Kawamura, Kyoto (JP)

(73) Assignee: Panasonic Corporation, Osaka (JP)

( * ) Notice: Subject to any disclaimer, the term of this patent is extended or adjusted under 35 U.S.C. 154(b) by 116 days.

(21) Appl. No.: 13/636,385

(22) PCT Filed: Jan. 30, 2012

(86) PCT No.: PCT/JP2012/000582
§ 371 (c)(1),
(2), (4) Date: Sep. 21, 2012

(87) PCT Pub. No.: WO2012/105222
PCT Pub. Date: Aug. 9, 2012

(65) Prior Publication Data
US 2013/0010160 A1 Jan. 10, 2013

(30) Foreign Application Priority Data
Jan. 31, 2011 (JP) .................................. 2011-018949

(51) Int. Cl.
*H04N 5/232* (2006.01)
*G03B 13/00* (2006.01)
*H04N 5/76* (2006.01)

(52) U.S. Cl.
USPC ...................................... 348/231.3; 348/348

(58) Field of Classification Search
CPC .. G02B 27/0075; G02B 27/00; H04N 5/2312; H04N 5/222292
USPC ................................................. 348/345–357
See application file for complete search history.

(56) References Cited

U.S. PATENT DOCUMENTS

| 5,124,842 A | 6/1992 | Honda et al. |
| 5,148,502 A | 9/1992 | Tsujiuchi et al. |

(Continued)

FOREIGN PATENT DOCUMENTS

| JP | 1-309478 | 12/1989 |
| JP | 5-313068 | 11/1993 |

(Continued)

OTHER PUBLICATIONS

International Search Report issued May 1, 2012 in corresponding International Application No. PCT/JP2012/000582.

(Continued)

*Primary Examiner* — Sinh Tran
*Assistant Examiner* — Shahbaz Nazrul
(74) *Attorney, Agent, or Firm* — Wenderoth, Lind & Ponack, L.L.P.

(57) ABSTRACT

An image restoration device according to the present invention includes: a point spread function storage unit which stores any two PSFs among a first range PSF for restoring a first sweep image serving as a sweep image when a sweep range is a first range; a second range PSF for restoring a second sweep image serving as the sweep image when the sweep range is a second range which excludes the first range; a third range PSF for restoring a third sweep image serving as the sweep image when the sweep range is a third range obtained by combining the first range and the second range; and a PSF calculation unit which performs addition or subtraction on the two PSFs to calculate a remaining one among the first, second, and third range PSFs.

9 Claims, 9 Drawing Sheets

(56) References Cited

U.S. PATENT DOCUMENTS

| | | | |
|---|---|---|---|
| 2007/0132861 A1* | 6/2007 | Furuki | 348/231.3 |
| 2008/0013941 A1 | 1/2008 | Daley | |
| 2008/0234984 A1* | 9/2008 | Ortyn et al. | 702/190 |
| 2008/0239088 A1* | 10/2008 | Yamashita | 348/222.1 |
| 2009/0297056 A1* | 12/2009 | Lelescu et al. | 382/261 |
| 2012/0154668 A1* | 6/2012 | Kimura et al. | 348/348 |
| 2013/0010086 A1* | 1/2013 | Iwasaki | 348/49 |
| 2013/0057681 A1* | 3/2013 | Kawamura et al. | 348/135 |
| 2013/0120550 A1* | 5/2013 | Chen et al. | 348/79 |
| 2013/0278726 A1* | 10/2013 | Muhammad et al. | 348/46 |

FOREIGN PATENT DOCUMENTS

| | | |
|---|---|---|
| JP | 3084130 | 9/2000 |
| JP | 3191928 | 7/2001 |
| JP | 2004-153497 | 5/2004 |
| JP | 2007-121896 | 5/2007 |
| JP | 2012-5063 | 1/2012 |

OTHER PUBLICATIONS

Hajime Nagahara et al., "Flexible Depth of Field Photography", European Conference on Computer Vision (ECCV), Oct. 2008.

\* cited by examiner

IMAGE RESTORATION DEVICE, IMAGING APPARATUS, AND IMAGE RESTORATION METHOD

TECHNICAL FIELD

The present invention relates to image restoration devices, imaging apparatuses, and image restoration methods, and particularly to an image restoration device for producing a restoration image having an extended depth of field, by restoring a sweep image which is captured by an imaging device and is subjected to focus sweep during exposure on an area, between focal points in an image space, which corresponds to a sweep range including a desirable distance range to be desirably focused, by driving the imaging device or a lens which collects light to the imaging device.

BACKGROUND ART

As typical methods for achieving an extended depth of field (hereinafter, referred to as EDOF), three methods described below can be primarily provided. The first method is to unify a blur in a depth direction by inserting an optical device referred to as a phase plate into an optical system. In this method, image restoration processing is performed on an obtained image, using a previously-measured blur pattern or a blur pattern calculated by simulation, thereby producing an EDOF image. The method is referred to as Wavefront coding (hereinafter, "WFC").

The second method is to perform a highly-accurate distance measurement for each of partial ranges in the image by devising a shape of an aperture. In this method, the image restoration processing is performed on each of the partial ranges, using blur patterns according to previously predicted respective distances, thereby producing the EDOF image. The method is referred to as a coded aperture (hereinafter, referred to as "CA").

The third method is to perform convolution on an image which is in-focus in a single uniform way in a depth direction, by moving a focusing lens or an imaging device during exposure (that is synonymous with uniformity of blurs in the respective depths). In the method, the image restoration processing is performed on the obtained image, using a previously measured blur pattern or a blur pattern calculated by simulation, thereby producing the EDOF image. The method is called as flexible DOF (hereinafter, referred to as "F-DOF") (see Patent Literature 1, for example).

Among the three methods, the third one, i.e., F-DOF, is the method by which most favorable image quality can be obtained, and which yields a superior EDOF effect. In addition, the F-DOF has an off-axis property which depends on a lens property itself, thereby easily enhancing capability. However, an optical condition requires a single subject be convoluted on a single image position, even if a focal position is moved during exposure. Accordingly, an image-space telecentric lens is required to be used.

The aforementioned EDOF has been applied to a microscope use for the longest time.

The EDOF has also been applied recently to a camera installed in a mobile phone and so on. The EDOF is used for the camera, enabling the camera to be miniaturized. This is because that the EDOF is effective to obtain a completely in-focus image (an image in which all subjects are in-focus) without an automatic focusing mechanism.

The EDOF can be further applied to a usual digital still camera and digital video camera. As a recent trend in the digital still camera and the digital video camera, these cameras are required to enable a user to perform shooting more easily with less failure. The EDOF can be expected to bring an effect of the completely in-focus image, i.e., release from making a mistake in focusing. For equipment to which the EDOF is applied, the most excellent method among the aforementioned methods is F-DOF because of it's high-quality image, significant EDOF effect, possibility of arbitrary change in a focal range, feasibility by applying the usual automatic focusing mechanism (unnecessity of a special optical system), and ease in switching between EDOF shooting and usual shooting.

CITATION LIST

Patent Literature

[PTL 1] Specification of United States patent application publication No. 2008/0013941

SUMMARY OF INVENTION

Technical Problem

However, in order to achieve an imaging apparatus (camera) having an F-DOF function capable of sweeping a plurality of focal ranges, point spread function (PSF) data item is required for performing restoration processing on images captured in the respective focal ranges.

Accordingly, increase in patterns of the focal ranges causes the number of the required PSF data items to increase. This unfortunately causes capacity of a memory for storing the PSF data items to increase.

The present invention is made to solve the above conventional problems, and an object of the present invention is to provide an image restoration device, imaging apparatus, and an image restoration method which are capable of reducing capacity of the memory for storing the PSF data item.

Solution to Problem

In order to achieve the above object, an image restoration device, according to an aspect of the present invention, for producing a restoration image having an extended depth of field, by restoring a sweep image which is captured by an imaging device and is subjected to focus sweep during exposure on an area, between focal points in an image space, which corresponds to a sweep range including a desirable distance range to be desirably focused, by driving the imaging device or a lens which collects light to the imaging device, the image restoration device includes: a point spread function (PSF) storage unit configured to store any two PSFs among (i) a first PSF to be used for restoring a first sweep image serving as the sweep image when the sweep range is a first range, (ii) a second PSF to be used for restoring a second sweep image serving as the sweep image when the sweep range is a second range which excludes the first range, and (iii) a third PSF to be used for restoring a third sweep image serving as the sweep image when the sweep range is a third range obtained by combining the first range and the second range; a PSF calculation unit configured to perform addition or subtraction on the two PSFs to calculate a remaining one among the first PSF, the second PSF, and the third PSF; an image restoration unit configured to (i) restore the first sweep image using the first PSF to produce the restoration image, (ii) restore the second sweep image using the second PSF to produce the restoration image, and (iii) restore the third sweep image using the third PSF to produce the restoration image.

With this configuration, the image restoration device according to an aspect of the present invention can calculates the remaining PSF from the two PSFs among the first PSF, the second PSF, and the third PSF. Accordingly, the remaining PSF does not need to be stored in the PSF storage unit. Therefore, the image restoration device according to an aspect of the present invention can reduce a volume of the PSF data items to be stored in the PSF storage unit.

The PSF calculation unit may be configured to add the first PSF and the second PSF to calculate the third PSF.

With this configuration, the image restoration device according to an aspect of the present invention can calculate the third PSF from the first PSF and the second PSF. Accordingly, the third PSF does not need to be stored in the PSF storage unit. Therefore, the image restoration device according to an aspect of the present invention can reduce the volume of the PSF data items to be stored in the PSF storage unit.

An imaging apparatus according to an aspect of the present invention includes: the image restoration device; the imaging device; the lens; a sweep range determination unit configured to determine, as the sweep range, any one of the first range, the second range, and the third range; a sweep imaging unit configured to determine the focal points in the image space which correspond to the sweep range, and to drive the lens or the imaging device to obtain an image subjected to the focus sweep during the exposure on the area between the focal points in the image space, to thereby cause the imaging device to capture the sweep image.

With this configuration, the imaging apparatus according to an aspect of the present invention can reduce the volume of the PSF data items to be stored in the PSF storage unit.

The sweep range determination unit may be configured to determine, as the sweep range, any one of the first range, the second range, and the third range based on a specified range specified by a user.

With this configuration, the imaging apparatus according to an aspect of the present invention can achieve an imaging apparatus which is capable of sweeping a focal range specified by the user.

The sweep range determination unit may be configured to determine, as the sweep range, any one among the first range, the second range, and the third range, which covers an entire range of the specified range and is also narrowest, when the specified range matches none of the first range, the second range, and the third range.

With this configuration, the imaging apparatus according to an aspect of the present invention can reduce the volume of the PSF data items to be stored in the PSF storage unit.

The sweep imaging unit may be configured to vary an image-space distance which is a distance between the imaging device and the lens, to move a focal position of the imaging device in a subject space, and a variation amount of the image-space distance for sweeping the focal position in the subject space within the first range may be equal to a variation amount of the image-space distance for sweeping the focal position in the subject space within the second range.

With this configuration, a distance to be swept in the first range and that in the second range are identical with each other. Accordingly, similarity between the first PSF and the second PSF can be increased. In other words, if the similarity is recognized within an admissible range, it is not necessary to store two types of PSFs, but a single type of PSF. Accordingly, the volume of the PSF data items can be reduced.

It should be noted that the present invention can be achieved not only as the aforementioned image restoration device and an imaging apparatus, but also as an image restoration method or a control method of the imaging apparatus, having, as steps, distinctive means included in the image restoration device or the imaging apparatus, and as a program causing a computer to execute these distinctive steps. It is needless to say that such a program can be distributed via a non-transitory computer readable recording medium including a CD-ROM and a transmission medium including the Internet.

Furthermore, the present invention can be achieved as a semiconductor integrated circuit (large-scale integration (LSI)) for achieving a part or all of functions of the image restoration device or the imaging apparatus.

Advantageous Effects of Invention

As described above, the present invention can provide an image restoration device, an imaging apparatus, and an image restoration method which are capable of reducing capacity of a memory for storing a PSF data item.

DESCRIPTION OF EMBODIMENTS

Hereinafter, embodiments of an imaging apparatus according the present invention are described in detail with reference to drawings. Each of the respective embodiments described below shows a specific example preferable for the present invention. A numeral value, a shape, a material, a component, an arrangement position and connection condition of the components, a step, and a flow of steps, and the like described in the embodiments are merely examples, and do not intend to limit the present invention. The present invention is limited only by the scope of claims. Accordingly, the component which is not defined in an independent claim representing the broadest concept of the present invention among components in the below-described embodiments is described as not being necessarily required for achieving the object of the present invention but constituting a more preferred embodiment.

Embodiment 1

An imaging apparatus according to Embodiment 1 of the present invention adds a first range PSF and a second range PSF, to thereby calculate a third range PSF. This allows the imaging apparatus to eliminate the necessity of storing the third range PSF in a memory, so that the imaging apparatus can reduce a volume of a PSF data item to be stored in the memory.

First, a configuration of the imaging apparatus according to Embodiment 1 of the present invention is described.

Figure 1:
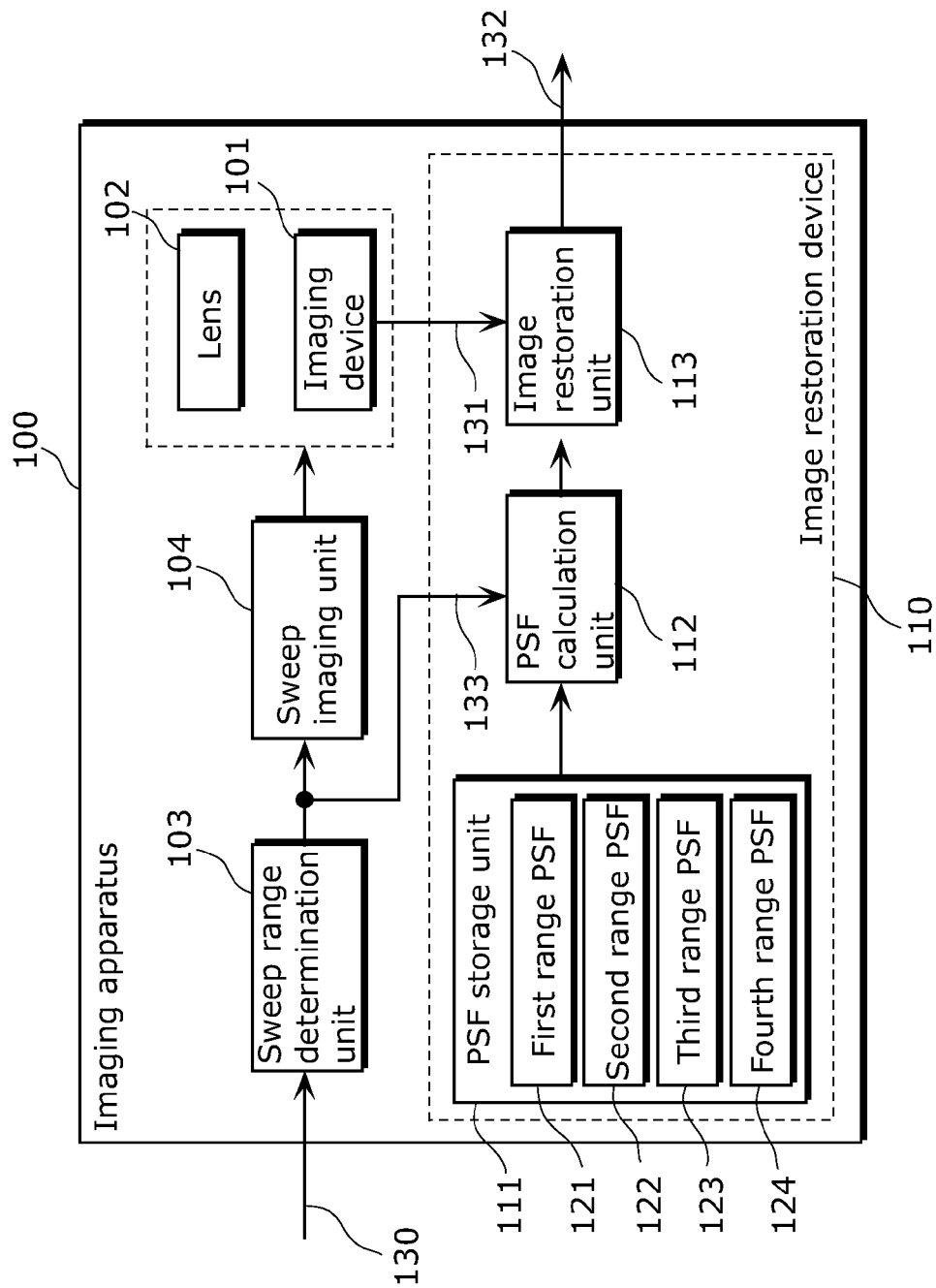
FIG. 1 is a block diagram which shows an imaging apparatus according to Embodiment 1 of the present invention.

FIG. 1 is a block diagram which shows an imaging apparatus 100 according to Embodiment 1 of the present invention.

The imaging apparatus 100 is a digital still camera or a digital video camera, for example. The imaging apparatus 100 has an F-DOF function with which an arbitrary focal range can be swept. To be specific, the imaging apparatus 100 produces a sweep image 131 in which a focal position is swept within a specified range 130 which is a focal range specified by a user. The imaging apparatus 100 performs the restoration processing on the produced sweep image 131 using the PSF, to produce a restoration image 132 in which the overall specified range 130 is in-focus.

The imaging apparatus 100 includes an imaging device 101, a lens 102, a sweep range determination unit 103, a sweep imaging unit 104, and an image restoration device 110.

The imaging device 101 performs photoelectric conversion on incident light to produce image data (the sweep image 131). The lens 102 collects light to the imaging device 101.

The sweep range determination unit 103 determines a sweep range 133 based on the specified range 130 specified by the user. Here, the sweep range indicates a general idea for the range in a subject space, not in an image space. For example, the sweep range determination unit 103 determines, as the sweep range 133, a range indicated by the specified range 130 among a plurality of predetermined ranges.

The sweep imaging unit 104 causes the imaging device 101 to capture the sweep image 131, while causing a focal point of the imaging device 101 to be swept within the sweep range 133. Specifically, the sweep imaging unit 104 calculates two focal points in the image space which correspond to the sweep range 133, and drives the lens 102 or the imaging device 101 so that an image can be obtained in which a distance between the two focal points in the image space is subjected to focus sweep during exposure, to thereby cause the imaging device to capture the sweep image. In other words, the sweep image 131 is an image captured by the imaging device 101 during a time period where a focal point in the subject space in the imaging device 101 is swept within the sweep range 133. Specifically, the sweep image 131 is an image subjected to the focus sweep during the exposure on an area, between the focal points in the image space, which corresponds to the sweep range including a desirable distance range to be desirably focused, by driving the imaging device 101 or the lens 102. It should be noted that the whole lens 102 may be driven, or a focusing lens which constitutes a part of the lens may be driven.

The image restoration device 110 performs the restoration processing on the sweep image 131 to produce a restoration image 132 in which a depth of field is extended. To be specific, the image restoration device 110 performs the restoration processing on the sweep image 131 using the PSF corresponding to the sweep range 133. Here, the restoration image 132 is an image in which the overall sweep range 133 is in-focus.

The image restoration device 110 includes a PSF storage unit 111, a PSF calculation unit 112, and an image restoration unit 113.

The PSF storage unit 111 stores a plurality of PSF data items which correspond to the respective sweep ranges 133. In the description, an example is described in which the PSF storage unit 111 stores four PSF data items (a first range PSF 121, a second range PSF 122, a third range PSF 123, and a fourth range PSF 124). In addition, the number of sweep ranges which can be specified by the user is larger than the number of the PSF data items which are to be stored in the PSF storage unit 111.

The PSF calculation unit 112 adds and normalizes two or more PSF data items among PSF data items stored in the PSF storage unit 111, to calculate new PSF data item corresponding to the sweep range 133.

The image restoration unit 113 restores the sweep image 131, using any one of the PSF data items stored in the PSF storage unit 111 or the PSF data item calculated by the PSF calculation unit 112, to produce the restoration image 132.

Next, operation of the imaging apparatus 100 is described.

Figure 2:
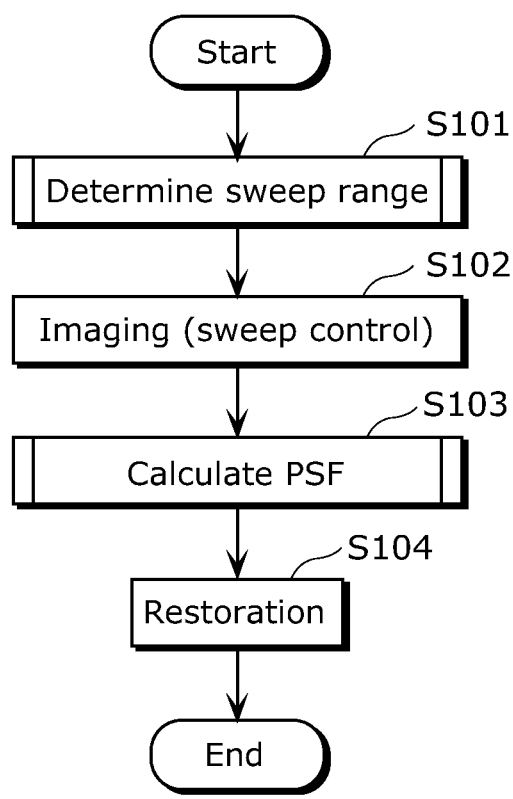
FIG. 2 is a flowchart which shows processing performed by the imaging apparatus according to Embodiment 1 of the present invention.

FIG. 2 is a flowchart which shows imaging processing performed by the imaging apparatus 100.

The sweep range determination unit 103 first determines the sweep range 133 based on the specified range 130 specified by the user (Step S101). For example, the user selects any one of the predetermined sweep ranges. The sweep range determination unit 103 determines the range specified by the user as the sweep range 133.

Next, the imaging apparatus 100 causes the imaging device 101 to capture the sweep image 131, while causing the focal point of the imaging device 101 to be swept within the sweep range 133 (Step S102).

Next, the PSF calculation unit 112 calculates the PSF data item which corresponds to the sweep range 133 (S103).

Hereinafter, the processing in Step S103 is described in detail.

Figure 3:
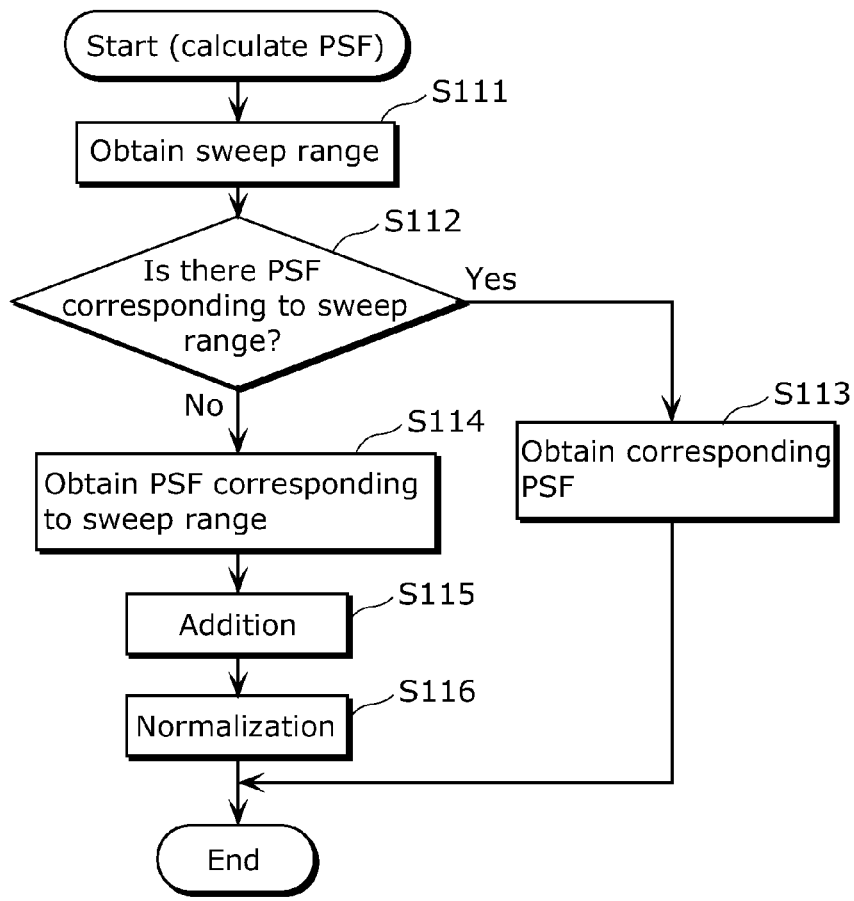
FIG. 3 is a flowchart which shows PSF calculation according to Embodiment 1 of the present invention.
Figure 4:
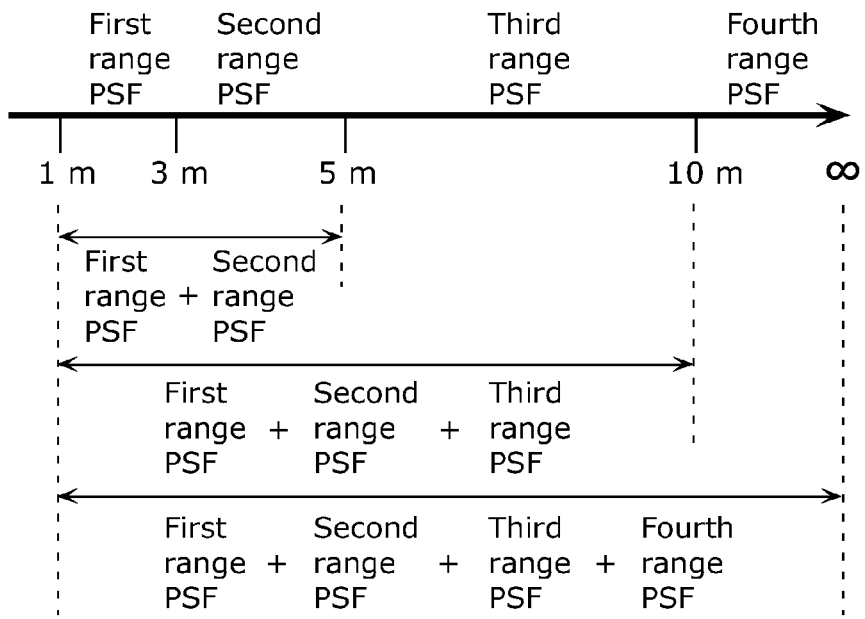
FIG. 4 is a diagram which shows an example of the PSF calculation according to Embodiment 1 of the present invention.

FIG. 3 is a flowchart which shows the PSF calculation processing performed by the PSF calculation unit 112. FIG. 4 is a diagram which shows an example of the PSF calculation processing performed by the PSF calculation unit 112.

As shown in FIG. 3, the PSF calculation unit 112 acquires the sweep range 133 for the sweep image 131, determined by the sweep range determination unit 103 (Step S111).

Here, the sweep range 133 includes, as shown in FIG. 4, ten types of ranges, which cover from 1, 3, 5, or 10 m as one end to 3, 5, 10, or infinity (∞) as the other end. The first range PSF 121 stored in the PSF storage unit 111 corresponds to a sweep range from 1 m to 3 m, the second range PSF 122 corresponds to a sweep range from 3 m to 5 m, the third range PSF 123 corresponds to a sweep range from 5 m to 10 m, and the fourth range PSF 124 corresponds to a sweep range from 10 m to infinity.

As described above, in the imaging apparatus 100 according to Embodiment 1 of the present invention, the PSF storage unit 111 stores only PSF data items corresponding to respective partial ranges defined in such a manner that a sweepable range (from 1 m to infinity) is divided into a plurality of ranges. The sweep range which can be specified by a user includes these partial ranges and plural types of ranges defined in such a manner that consecutive two or more partial ranges are combined with each other among the partial ranges.

Next, the PSF calculation unit 112 determines whether or not the PSF data item corresponding to the sweep range 133 acquired in the Step S111 is stored in the PSF storage unit 111 (Step S112). In the above example, the PSF calculation unit 112 determines that the PSF data item corresponding to the sweep range 133 is stored in the PSF storage unit 111, when the sweep range 133 is any one of the range from 1 m to 3 m, the range from 3 m to 5 m, the range from 5 m to 10 m, and the range from 10 m to infinity (Yes in Step S112). The PSF calculation unit 112 also determines that the PSF data item corresponding to the sweep range 133 is not stored in the PSF storage unit 111, when the sweep range 133 corresponds to a range other than the above ranges (for example, a range from 1 m to 10 m) (No in Step S112).

When the PSF data item corresponding to the sweep range 133 is stored in the PSF storage unit 111 (Yes in Step S112), the PSF calculation unit 112 acquires PSF data item which corresponds to the sweep range 133, from the PSF storage unit 111 (Step S113). The PSF calculation unit 112 passes the acquired PSF data item to the image restoration unit 113.

On the other hand, when the PSF data item corresponding to the sweep range 133 is not stored in the PSF storage unit 111 (No in the Step S112), the PSF calculation unit 112 acquires, from the PSF storage unit 111, the PSF data items corresponding to the respective partial ranges included in the sweep range 133 (Step S114).

Next, the PSF calculation unit 112 adds and normalizes the acquired PSF data items corresponding to the respective partial ranges, to calculate the PSF data item corresponding to the sweep range 133 (Steps S115 and S116). The PSF calculation unit 112 passes the calculated PSF data item to the image restoration unit 113.

For example, when the sweep range is defined in the range from 1 m to 5 m as shown in FIG. 4, the PSF calculation unit 112 adds and normalizes the first range PSF 121 and the second range PSF 122, to calculate the PSF data item corresponding to the range from 1 m to 5 m. When the sweep range is defined in the range from 1 m to 10 m, the PSF calculation unit 112 adds and normalizes the first range PSF 121, the second range PSF 122, and the third range PSF 123, to calculate the PSF data item corresponding to the range from 1 m to 10 m.

Again, the flowchart shown in FIG. 2 is used for the description.

After the PSF calculation processing (Step S103), the image restoration unit 113 restores the sweep image 131 using the PSF data item which is passed from the PSF calculation unit 112 and corresponds to the sweep range 133, to thereby produce the restoration image 132 (Step S104). The image restoration unit 113 outputs the produced restoration image 132 outside the imaging apparatus 100 or stores the produced restoration image 132 in a storage unit (not shown) provided in the imaging apparatus 100.

As described above, the imaging apparatus 100 according to Embodiment 1 of the present invention can calculate the PSF data item which corresponds to a new range, from PSF data items stored in the PSF storage unit 111. Accordingly, the PSF storage unit 111 does not need to store the PSF data item which corresponds to the new range. Thus, in the imaging apparatus 100 according to Embodiment 1 of the present invention, a volume of the PSF data items to be stored in the PSF storage unit 111 can be reduced.

Each of the processing in the Steps S102 to S104 is performed with respect to each shooting of still images when a still image is taken, while performed with respect to every single frame when a moving picture is taken. When a still image is taken, the processing in the Step S101 may be performed with respect to each shooting of still images, or the processing in the Step S101 may previously performed, and then, a plurality of still images may be taken using the sweep range 133 set in Step S101. When a moving picture is taken, the processing in the Step S101 is performed with respect to a single shooting or each of moving-picture shootings.

Although the sweep range determination unit 103 determines the sweep range 133 based on the specified range 130 specified by the user in the above description, the sweep range determination unit 103 may automatically determine the sweep range 133 in accordance with a result of detection performed by a sensor provided in the imaging apparatus 100. For example, the sweep range determination unit 103 may determine the sweep range 133 in accordance with a distance to a subject, which is used in an automatic focusing function or the like, or in accordance with a condition of a scene (brightness, for example). Such a distance to the subject and a condition of the field may be calculated from a taken image. Furthermore, the sweep range determination unit 103 may determine the sweep range 133 based on the information and the specified range 130, or may adjust the sweep range 133 in accordance with the information.

Still further, when the sweep range 133 is automatically determined or adjusted as described above in shooting of a moving picture, the determination or adjustment of the sweep range 133 is performed with respect to a single frame or plural frames.

Although the PSF storage unit 111 stores four PSF data items in the above description, the number of the PSF data items stored in the PSF storage unit 111 may be an arbitrary number as long as the number is two or more. In other words, the number of partial ranges obtained by dividing the sweepable range (a range from 1 m to infinity in the above example) may be two or more. To be specific, it is only necessary for the imaging apparatus 100 to be able to select, as the sweep range 133, at least the first range, the second range which comes next to the first range, and the third range obtained by combining the first and second ranges. In this case, it is only necessary that the PSF data items which correspond to the respective first range and the second range are stored in the PSF storage unit 111. The second range may be a range which does not include the first range.

It should be noted that the number of the partial ranges is desirably 2 to the n-th power (n is an integer of 1 or more) in terms of efficiency of the various processing. For example, the number of the partial ranges is 4, 8, 16, 32, or 64.

Hereinafter, principle is described in which the PSF data item corresponding to a range obtained by combining consecutive partial ranges can be calculated by adding the PSF data items corresponding to the consecutive partial ranges.

Figure 5:
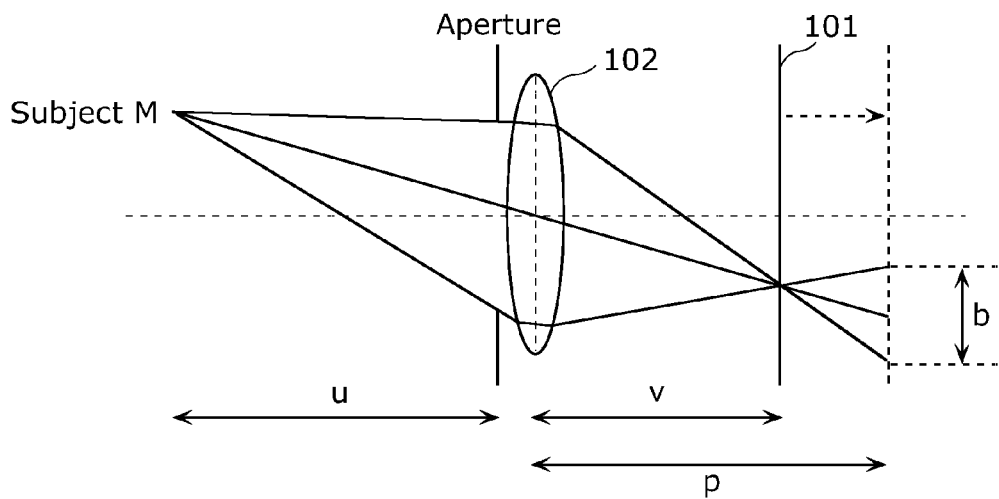
FIG. 5 is a diagram which shows a subject distance and an image-space distance according to Embodiment 1 of the present invention.

FIG. 5 is a diagram which shows a relationship between the subject, the lens 102, and the imaging device 101.

As shown in FIG. 5, a distance between a subject M and the lens 102 is represented by a subject distance u, while a distance between the lens 102 and the imaging device 101 is represented by an image-space distance v. In this case, the below shown Expression 1 can be established by a typical formula of a lens using the subject distance u, the image-space distance v, and a focal distance f.

[Expression 1]

$$\frac{1}{f} = \frac{1}{u} + \frac{1}{v} \qquad \text{Expression 1}$$

Here, when the imaging device 101 moves from a position at the image-space distance v to a position at an image-space distance p as shown in FIG. 5, a diameter b of a blur is expressed by below shown Expression 2.

[Expression 2]

$$b = \frac{a}{v}|(v - p)| \qquad \text{Expression 2}$$

Here, a denotes a size of an aperture.

In a lens model, such as Pillbox, P which is the PSF is expressed by below shown Expression 3.

[Expression 3]

$$P(r, u, p) = \frac{4}{\pi b^2} \prod \left(\frac{r}{b}\right) \qquad \text{Expression 3}$$

Here, r denotes a distance from a center of the blur, while Π(x) expresses rectangular function. The Π(x) becomes 1 when |x|<½, while Π(x) becomes 0 when |x| is other than |x|<½.

Figure 6:
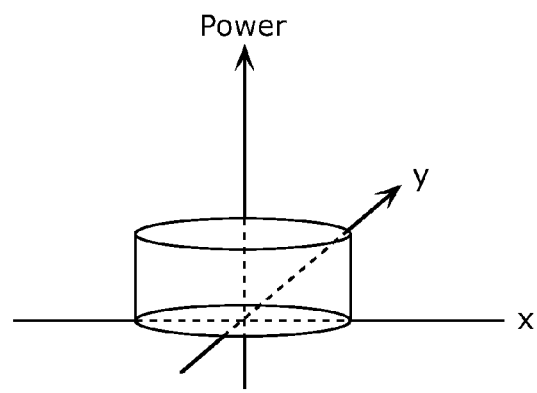
FIG. 6 is a diagram which shows a model of the PSF according to Embodiment 1 of the present invention.

FIG. 6 is a diagram which shows the PSF in the lens model of the Pillbox.

Here, the PSF to be used in the sweep image is called as IPSF. The IPSF when a focal point is swept in a range from time 0 to time T is expressed by below shown Expression 4.

[Expression 4]

$$IP(r, u) = \int_0^T P(r, u, p(t))dt \qquad \text{Expression 4}$$

As shown in Expression 4, the IPSF is expressed by integration. Specifically, the sum of IPSF from time T1 to time T2 and IPSF from time T2 to time T3 becomes IPSF from time T1 to time T3.

A function itself in terms of an integral term remains unchanged under a rule in which a sweep action p(t) is at a constant speed. Accordingly, the IPSF from the time T1 to the time T3 is equivalent to setting of a starting time and an ending time of the integration respectively to the time T1 and the time T3.

As described above, the PSF data items in the consecutive partial ranges are added to calculate the PSF data in the range obtained by combining the partial ranges.

Next, a specific example of sweep action is described.

Figure 7:
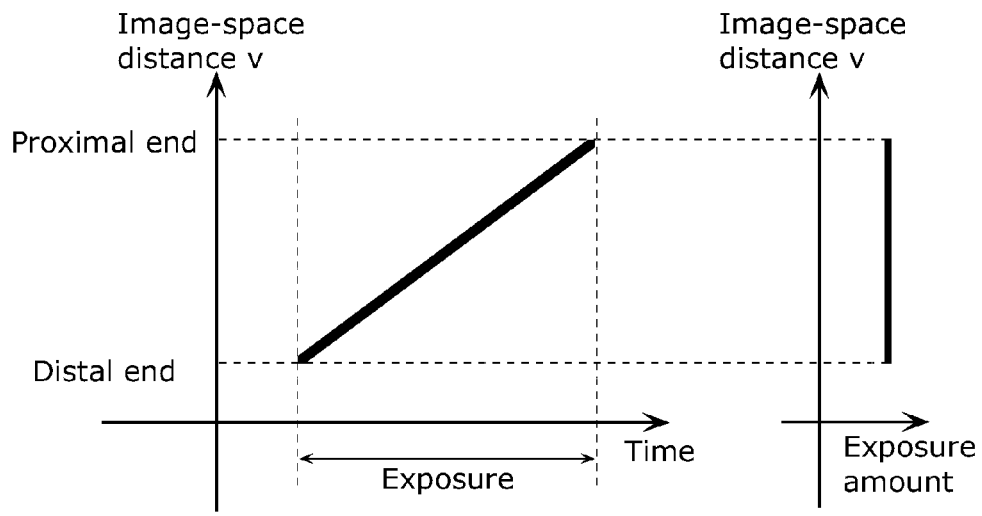
FIG. 7 is a diagram which shows an example of a pattern of movement of the image-space distance according to Embodiment 1 of the present invention.

FIG. 7 is a diagram which shows variation in the image-space distance v during exposure, and an exposure amount. As shown in FIG. 7, the sweep imaging unit 104 causes the image-space distance v to be varied at a constant speed, so as to vary the subject distance u which serves as the focal point of the imaging device 101 in the subject space. The sweep imaging unit 104 may displace a position of the lens 102, to thereby vary the image-space distance v, may displace a position of the imaging device 101, to thereby vary the image-space distance v, or may displace both of the lens 102 and the imaging device 101, to thereby vary the image-space distance v.

Figure 8:
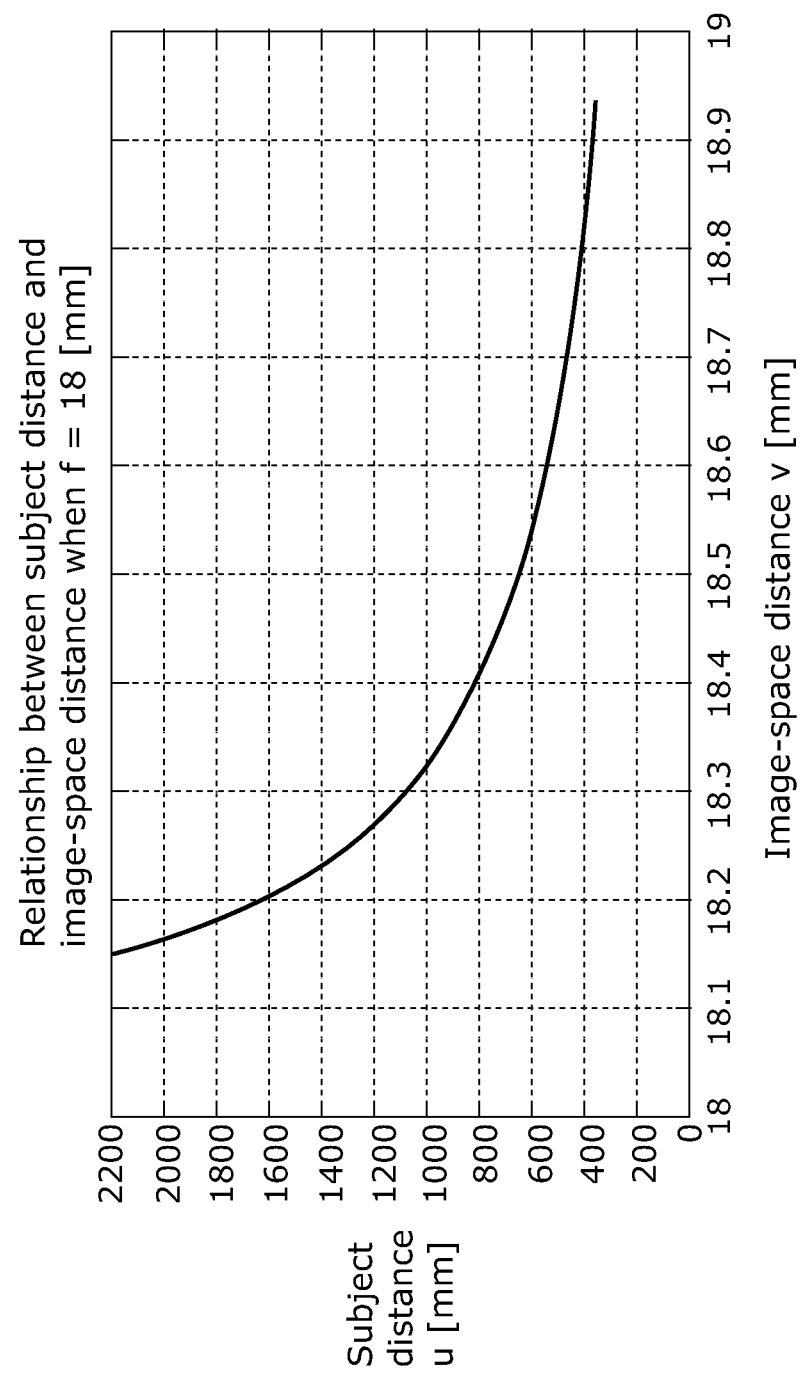
FIG. 8 is a graph which shows a relationship between the subject distance and the image-space distance according to Embodiment 1 of the present invention.

FIG. 8 is a graph which shows a relationship between the image-space distance v and the subject distance u when the focal distance f is 18 [mm]. As shown in FIG. 8, even if the image-space distance v varies at a uniform speed, the subject distance u does not vary at a uniform speed.

As shown in FIG. 4, in the imaging apparatus 100 according to Embodiment 1 of the present invention, partial ranges, i.e., ranges in the subject distance u are not equal to one another.

Meanwhile, in the imaging apparatus 100, the partial ranges are determined so that an amount of variation in the image-space distance v corresponding to each of the partial ranges becomes constant.

Figure 9:
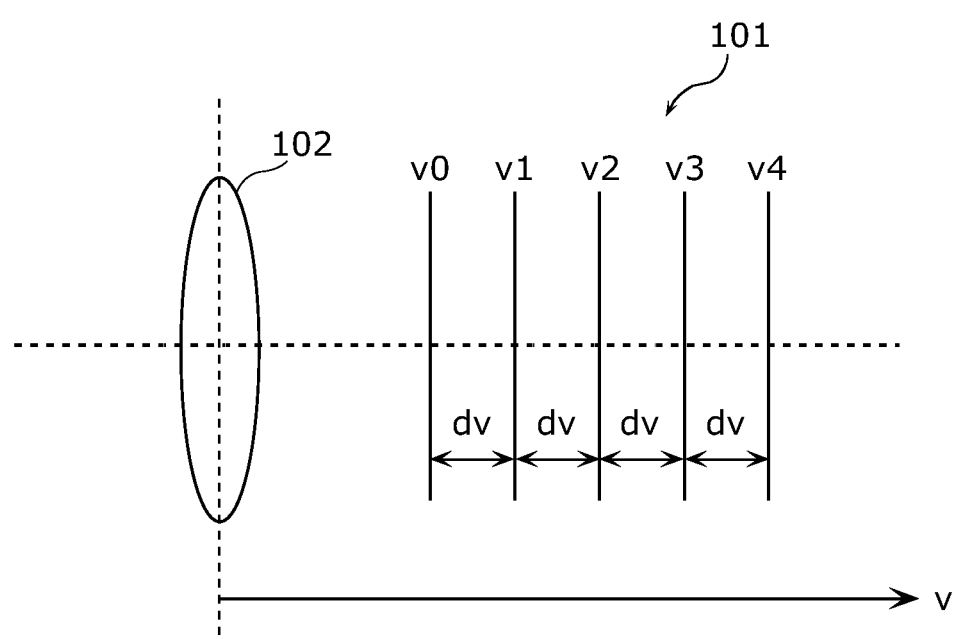
FIG. 9 is a diagram which shows an amount of variation in the image-space distance according to Embodiment 1 of the present invention.

FIG. 9 is a diagram which shows an amount of variation in the image-space distance v according to Embodiment 1 of the present invention.

As shown in FIG. 9, variation amounts dv of the image-space distance v for sweeping each of the partial ranges, are constant. A range of the image-space distance from v0 to v1 shown in FIG. 9 corresponds to the sweep range from 10 m to infinity, a range of the image-space distance from v1 to v2 corresponds to the sweep range from 5 m to 10 m, a range of the image-space distance from v2 to v3 corresponds to the sweep range from 3 m to 5 m, and a range of the image-space distance from v3 to v4 corresponds to the sweep range from 1 m to 3 m.

As described above, the variation amount dv in the image-surface distance v is kept constant, to thereby cause S/N ratios in the partial ranges to be at a similar level. Accordingly, similarity of the PSFs each of which is allocated to a corresponding one of the partial ranges can be increased. With this configuration, processing and the like can be made at the similar level, so that every control can be effectively performed.

Figure 10:
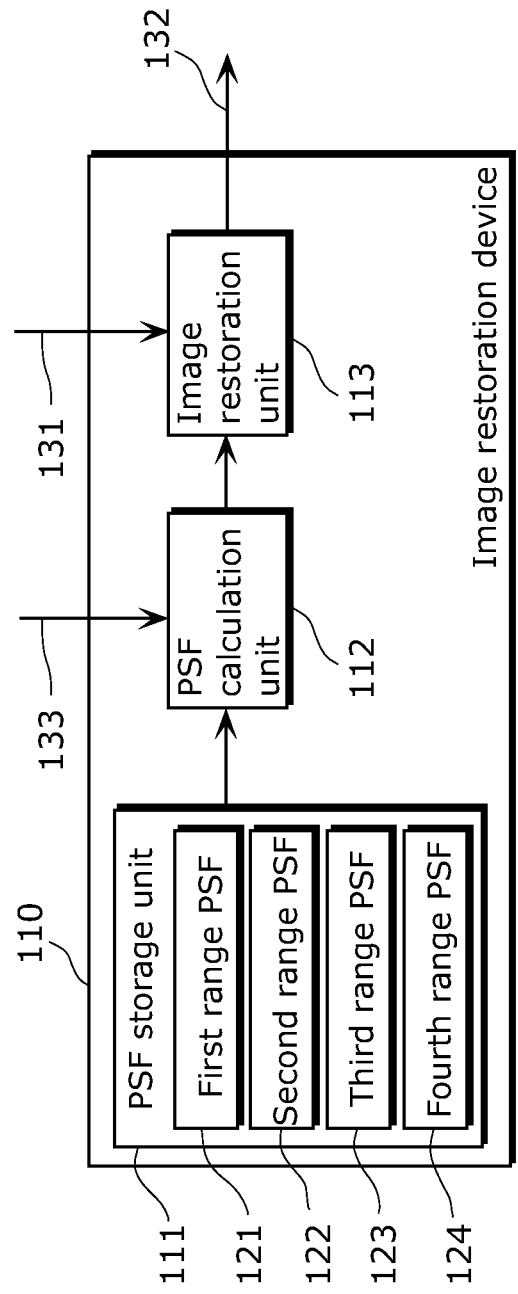
FIG. 10 is a block diagram which shows an imaging restoration device according to Embodiment 1 of the present invention.

Although an example in which the present invention is applied to the imaging apparatus is described, the present invention can also be achieved as the image restoration device 110 described above. FIG. 10 is a block diagram which shows the image restoration device 110 according to Embodiment 1 of the present invention. The image restoration device 110 can be achieved as a semiconductor integrated circuit used for the aforementioned imaging apparatus 100, for example. In addition, the image restoration device 110 can be achieved as a device which restores the sweep image 131 taken by the imaging apparatus, and is independent of the imaging apparatus. The image restoration device 110 may be installed in an apparatus, such as a personal computer.

Figure 11:
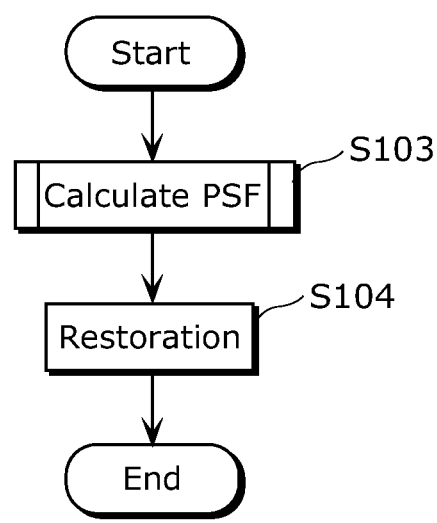
FIG. 11 is a flowchart which shows processing performed by the imaging restoration device according to Embodiment 1 of the present invention.

FIG. 11 is a flowchart which shows the imaging processing performed by the image restoration device 110. It should be noted that the processing in Steps S103 and S104 shown in FIG. 11 are the same with those in the Steps S103 and S104 shown in FIG. 2.

As described above, the imaging apparatus 100 and the image restoration device 110 according to Embodiment 1 of the present invention calculate a PSF data item for a certain sweep range 133, from the PSF data items in the partial ranges which constitute the sweep range 133. Thus, the imaging apparatus 100 and the image restoration device 110 according to Embodiment 1 of the present invention can reduce the volume of the PSF data items to be stored in the PSF storage unit 111.

If the present invention is applied to a portable camera, such as a digital still camera, a digital video camera, and a camera for a mobile phone, a memory use in the portable camera having a limited memory capacity can be more advantageously reduced.

Embodiment 2

In Embodiment 2 of the present invention, modification of the imaging apparatus 100 according to aforementioned Embodiment 1 is described. Hereinafter, a difference from Embodiment 1 is mainly described, and description for an overlapping point with Embodiment 1 is omitted.

Although a user selects any one from previously-determined sweep ranges in the aforementioned Embodiment 1, a user can specify an arbitrary sweep range in Embodiment 2.

The imaging apparatus 100 according to Embodiment 2 of the present invention is different from the imaging apparatus 100 according to Embodiment 1 in a function of the sweep range determination unit 103.

Figure 12:
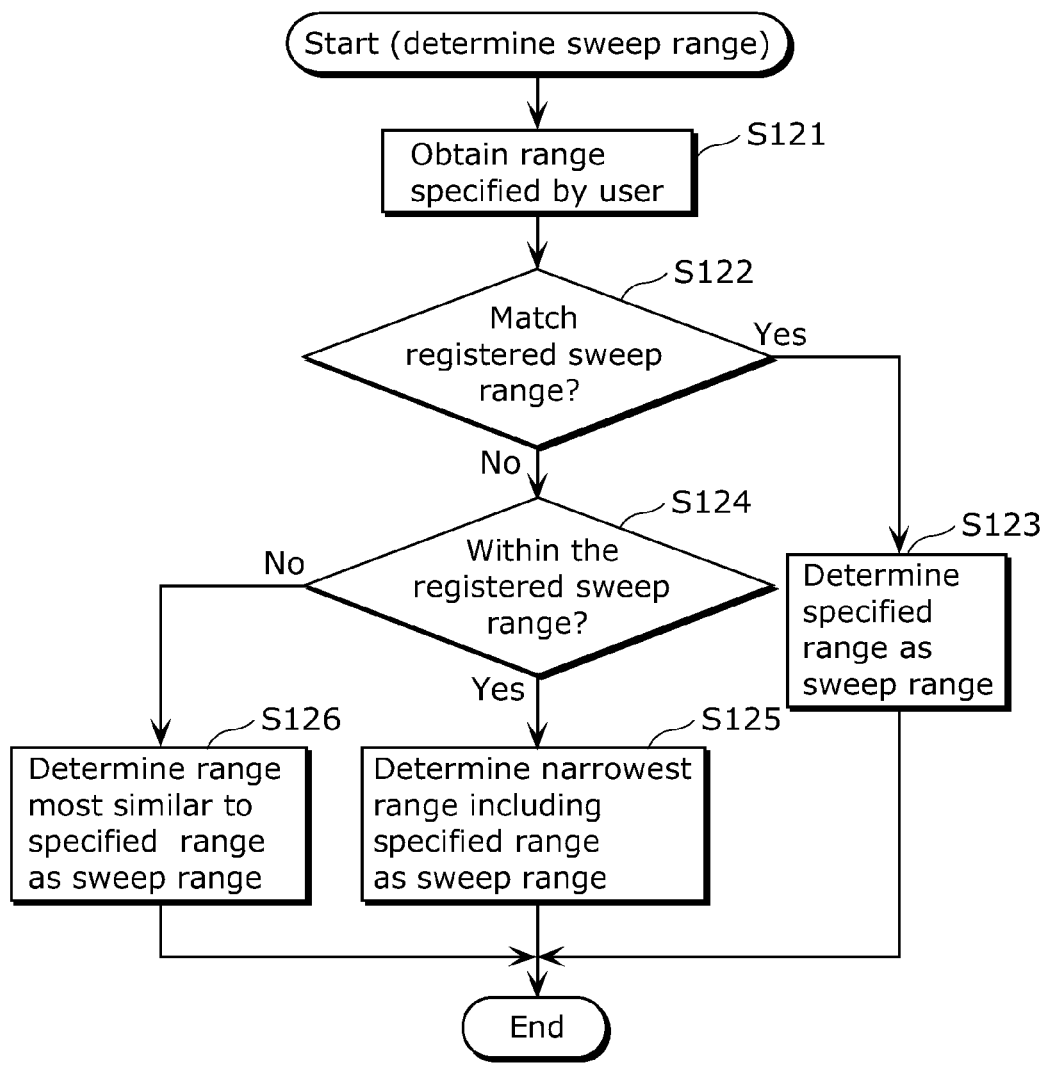
FIG. 12 is a flowchart which shows sweep-range determination processing according to Embodiment 2 of the present invention.
Figure 13:
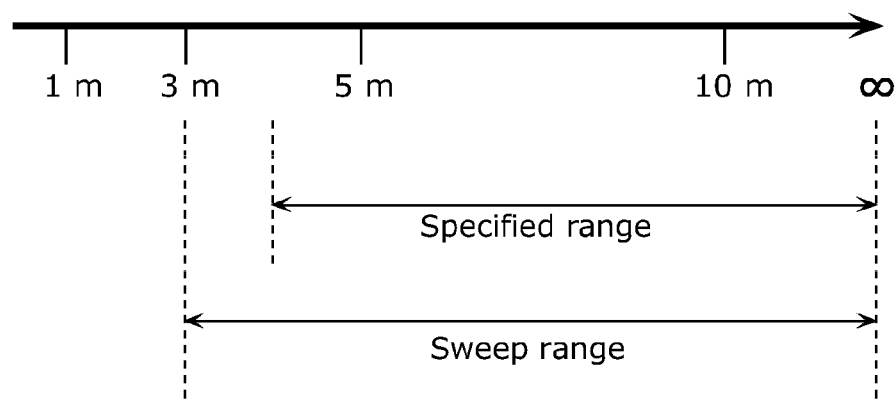
FIG. 13 is a diagram which shows an example of the sweep-range determination processing according to Embodiment 2 of the present invention.

FIG. 12 is a flowchart which shows a sweep range determination processing (Step S101 in FIG. 2) performed by the sweep range determination unit 103 according to Embodiment 2. FIG. 13 is a diagram which shows an example of the sweep range determination processing.

As shown in FIG. 12, the sweep range determination unit 103 first acquires the specified range 130 from a user (Step S121). Here, the specified range 130 is, for example, an arbitrary sweep range specified by the user.

Next, the sweep range determination unit 103 determines whether or not the specified range 130 matches any one of previously registered ranges (hereinafter, referred to as "registered ranges") (Step S122). Here, the registered ranges are, for example, ten types of ranges shown in FIG. 4 as described in Embodiment 1.

If the specified range 130 matches any one of registered ranges (Yes in Step S122), the sweep range determination unit 103 determines the specified range 130 as the sweep range 133 (Step S123).

In contrast, if the specified range 130 does not match any of registered ranges (No in Step S122), the sweep range determination unit 103 determines whether or not the overall specified range 130 is covered by a sweepable range (in a range from 1 m to infinity, for example) (Step S124).

If the overall specified range 130 is covered by the sweepable range (Yes in Step S124), the sweep range determination unit 103 determines, as the sweep range 133, a range which covers the overall specified range 130 and is also the narrowest range, among the registered ranges (Step S125).

If the specified range 130 is in a range from 4 m to infinity as shown in FIG. 13, the sweep range determination unit 103 determines a range from 3 m to infinity as the sweep range 133.

In contrast, if the specified range 130 exceeds the sweepable range (No in Step S124), the sweep range determination unit 103 determines a range most similar to the specified range 130, as the sweep range 133 (Step S126).

For example, if the specified range 130 is in a range from 0.5 m to 3 m, the sweep range determination unit 103 determines a range from 1 m to 3 m, as the sweep range 133.

To be specific, if a proximal end of the specified range 130 (an end close to the imaging apparatus 100) is closer to the imaging apparatus 100 than a proximal end of the sweepable range, the sweep range determination unit 103 sets the proximal end of the sweep range 133 at the proximal end of the sweepable range. Similarly, if a distal end of the specified range 130 (an end distant from the imaging apparatus 100) is further from an distal end of the sweepable range, the sweep range determination unit 103 sets the distal end of the sweep range 133 at the distal end of the sweepable range. Since, in an example shown in FIG. 13, the distal end of the sweepable range is at infinity, the distal end of the specified range 130 is not further than the distal end of the sweepable range. However, if the distal end of the sweepable range has a limit thereon, such a case as above occurs.

In Step S125, the sweep range determination unit 103 may determine the range most similar to the specified range 130 among the registered ranges as the sweep range 133.

The sweep range determination unit 103 may previously fix a threshold value in each of the partial ranges. If the proximal end of the specified range 130 is less than the threshold value, the sweep range determination unit 103 may determine the proximal end of the partial range as the proximal end of the sweep range 133, while if the proximal end of the specified range 130 is equal to or more than the threshold value, the sweep range determination unit 103 may determine the distal end of the partial range as the proximal end of the sweep range 133. Similarly, the sweep range determination unit 103 may determine the proximal end of the partial range to be the distal end of the sweep range 133, if the distal end of the specified range 130 is less than the threshold value, while it may determine the distal end of the partial range as the proximal end of the sweep range 133, if the distal end of the specified range 130 is equal to or more than the threshold value. For example, the threshold value is set to 4.5 m with respect to the partial range from 3 m to 5 m. In this case, if the specified range 130 is in a range from 4 m to infinity as shown in FIG. 13, the proximal end (4 m) is less than the threshold value (4.5 m). Accordingly, the sweep range determination unit 103 determines the proximal end (3 m) of the partial range as the proximal end of the sweep range 133.

As shown in FIG. 13, a method for determining a range broader than the specified range 130 as the sweep range 133 can advantageously produce the restoration image 132 which comes into focus at least on the range specified by the user.

As described above, in the imaging apparatus 100 according to Embodiment 2 of the present invention, the range which covers the overall specified ranges 130 and is also the narrowest range among the registered ranges is determined as the sweep range 133. This allows the imaging apparatus 100 to reduce types of the sweep ranges to be subjected to practical sweep-imaging, thereby reducing types of PSF data items to be required. Thus, the imaging apparatus 100 can reduce the volume of the PSF data items to be stored in the PSF storage unit 111.

The imaging apparatus 100 can produce the restoration image 132 in which at least the range specified by the user is in-focus, by determining the range broader than the specified range 130 as the sweep range 133. As described above, the imaging apparatus 100 can take an image which satisfies user's request, as well as reduce the volume of the PSF data items to be stored in the PSF storage unit 111.

Although the imaging apparatus according to the embodiments of the present invention is described, the present invention is not limited to the embodiments.

For example, though an example of producing the new PSF data item by adding and normalizing two PSF data items is described in the above description, the new PSF data item may be produced by subtracting and normalizing two PSF data items. For example, the imaging apparatus 100 stores the PSF data item in the range from 1 m to 3 m and the PSF data item in the range from 1 m to 5 m, and may produce the PSF data item in the range from 3 m to 5 m by subtracting and normalizing the PSF data item in the range from 1 m to 3 m from the PSF data item in the range from 1 m to 5 m.

Specifically, the imaging apparatus 100 stores any two PSF data items among the PSF data item for the first range, the PSF data item for the second range which does not include the first range, and the PSF data item for the third range which is obtained by combining the first range and the second range, and performs addition or subtraction on the two PSF data items, to thereby calculate the remaining one PSF data item among the above described three PSF data items.

The imaging apparatus and the image restoration device according to the aforementioned embodiments include processing units each of which is typically achieved as a large-scale integration (LSI) serving as an integrated circuit. These units may be separately made into chips or may be made into a single chip including a part or all of the units.

Moreover, ways to achieve integration are not limited to the LSI, and a special circuit or a general purpose processor and so forth can also achieve the integration. Field programmable gate array (FPGA) which can be programmed after the LSI is manufactured, or a reconfigurable processor that allows re-configuration of the connection or configuration of LSI can be used for the same purpose.

A part or all of functions for the imaging apparatus or the image restoration device according to the embodiments of the present invention may be achieved by a processor, such as a CPU, to execute a program.

Furthermore, the present invention may be the program, or a non-transitory computer readable recording medium which stores the program. It is needless to say that the program can be distributed via a transmission medium, such as the Internet.

At least a part of functions of the imaging apparatus, the image restoration device, and their modifications according to Embodiments 1 and 2 may be combined with one another.

All reference numerals used in the above are provided as an example for specifically describing the present invention, and the present invention is not limited to the provided numerals. Connection relationship among elements id provided as an example for specifically describing the present invention, and the connection relationship which achieves the functions of the present invention is not limited thereto.

Furthermore, modifications, to the embodiments, conceivable by a person skilled in the art are included in the present invention unless these modifications are depart from the scope of the present invention.

INDUSTRIAL APPLICABILITY

The present invention is applicable to an imaging apparatus, such as a digital still camera, digital video camera, and so on.

REFERENCE SIGNS LIST

100 Imaging apparatus
101 Imaging device
102 Lens
103 Sweep range determination unit
104 Sweep imaging unit
110 Image restoration device
111 PSF storage unit
112 PSF calculation unit
113 Image restoration unit
121 First range PSF
122 Second range PSF
123 Third range PSF
124 Fourth range PSF
130 Specified range
131 Sweep image
132 Restoration image
133 Sweep range

The invention claimed is:

1. An image restoration device for producing a restoration image having an extended depth of field, by restoring a sweep image which is captured by an imaging device and is subjected to focus sweep during exposure on an area, between focal points in an image space, which corresponds to a sweep range including a desirable distance range to be desirably focused, by driving the imaging device or a lens which collects light to the imaging device, the image restoration device comprising:
   a point spread function (PSF) storage unit configured to store any two PSFs among (i) a first PSF to be used for restoring a first sweep image serving as the sweep image when the sweep range is a first range, (ii) a second PSF to be used for restoring a second sweep image serving as the sweep image when the sweep range is a second range which excludes the first range, and (iii) a third PSF to be used for restoring a third sweep image serving as the sweep image when the sweep range is a third range obtained by combining the first range and the second range;
   a PSF calculation unit configured to perform addition or subtraction on the two PSFs to calculate a remaining one among the first PSF, the second PSF, and the third PSF;
   an image restoration unit configured to (i) restore the first sweep image using the first PSF to produce the restoration image, (ii) restore the second sweep image using the second PSF to produce the restoration image, and (iii) restore the third sweep image using the third PSF to produce the restoration image.

2. The image restoration device according to claim 1, wherein the PSF calculation unit is configured to add the first PSF and the second PSF to calculate the third PSF.

3. An imaging apparatus comprising:
the image restoration device according to claim 1;
the imaging device;
the lens;
a sweep range determination unit configured to determine, as the sweep range, any one of the first range, the second range, and the third range;
a sweep imaging unit configured to determine the focal points in the image space which correspond to the sweep range, and to drive the lens or the imaging device to obtain an image subjected to the focus sweep during the exposure on the area between the focal points in the image space, to thereby cause the imaging device to capture the sweep image.

4. The imaging apparatus according to claim 3, wherein the sweep range determination unit is configured to determine, as the sweep range, any one of the first range, the second range, and the third range based on a specified range specified by a user.

5. The imaging apparatus according to claim 4, wherein the sweep range determination unit is configured to determine, as the sweep range, any one among the first range, the second range, and the third range, which covers an entire range of the specified range and is also narrowest, when the specified range matches none of the first range, the second range, and the third range.

6. The imaging apparatus according to claim 3, wherein the sweep imaging unit is configured to vary an image-space distance which is a distance between the imaging device and the lens, to move a focal position of the imaging device in a subject space, and a variation amount of the image-space distance for sweeping the focal position in the subject space within the first range is equal to a variation amount of the image-space distance for sweeping the focal position in the subject space within the second range.

7. An image restoration method for producing a restoration image having an extended depth of field, by restoring a sweep image which is captured by an imaging device and is subjected to focus sweep during exposure on an area, between focal points in an image space, which corresponds to a sweep range including a desirable distance range to be desirably focused, by driving the imaging device or a lens which collects light to the imaging device, the image restoration method comprising:

performing addition or subtraction on any two PSFs among (i) a first PSF to be used for restoring a first sweep image serving as the sweep image when the sweep range is a first range, (ii) a second PSF to be used for restoring a second sweep image serving as the sweep image when the sweep range is a second range which excludes the first range, and (iii) a third PSF to be used for restoring a third sweep image serving as the sweep image when the sweep range is a third range obtained by combining the first range and the second range, to calculate a remaining one among the first PSF, the second PSF, and the third PSF; and producing (i) the restoration image by restoring the first sweep image using the first PSF; (ii) the restoration image by restoring the second image using the second PSF; and (iii) the restoration image by restoring the third image using the third PSF.

8. A non-transitory computer-readable recording medium which holds a program for causing a computer to execute the image restoration method according to claim 7.

9. An integrated circuit for producing a restoration image having an extended depth of field, by restoring a sweep image which is captured by an imaging device and is subjected to focus sweep during exposure on an area, between focal points in an image space, which corresponds to a sweep range including a desirable distance range to be desirably focused, by driving the imaging device or a lens which collects light to the imaging device, the integrated circuit comprising:

a PSF storage unit configured to store any two PSFs among (i) a first PSF to be used for restoring a first sweep image serving as the sweep image when the sweep range is a first range, (ii) a second PSF to be used for restoring a second sweep image serving as the sweep image when the sweep range is a second range which excludes the first range, (iii) a third PSF to be used for restoring a third sweep image serving as the sweep image when the sweep range is a third range obtained by combining the first range and the second range;

a PSF calculation unit configured to perform addition or subtraction on the two PSFs to calculate a remaining PSF among the first PSF, the second PSF, and the third PSF; and an image restoration unit configured to (i) restore the first sweep image using the first PSF to produce the restoration image, (ii) restore the second sweep image using the second PSF to produce the restoration image, and (iii) restore the third image using the third PSF to produce the restoration image.

* * * * *